US 6,628,124 B1

United States Patent
Yamagata et al.

(10) Patent No.: US 6,628,124 B1
(45) Date of Patent: Sep. 30, 2003

(54) ELECTROCAPACITIVE FORCE MEASURING APPARATUS

(75) Inventors: Yutaka Yamagata, Wako (JP); Tsunehiko Ozaki, Wako (JP); Victor Morozov, Pushchino (RU); Kozo Inoue, Tokyo (JP)

(73) Assignees: Riken, Saitama (JP); S. T. Research Company, Limited, Tokyo (JP)

( * ) Notice: Subject to any disclaimer, the term of this patent is extended or adjusted under 35 U.S.C. 154(b) by 0 days.

(21) Appl. No.: 09/674,387

(22) PCT Filed: Mar. 3, 2000

(86) PCT No.: PCT/JP00/01297

§ 371 (c)(1),
(2), (4) Date: May 17, 2001

(87) PCT Pub. No.: WO00/52439

PCT Pub. Date: Sep. 8, 2000

(30) Foreign Application Priority Data

Mar. 4, 1999 (JP) ............................................. 11-057381

(51) Int. Cl.[7] ............................................. G01R 27/04
(52) U.S. Cl. .................. 324/633; 73/862.41; 73/862.59
(58) Field of Search ....................... 324/633; 73/862.41, 73/862.59, 716, 514.29, 514.36, 514.32

(56) References Cited

U.S. PATENT DOCUMENTS

| | | | |
|---|---|---|---|
| 3,595,084 A | * 7/1971 | Bailey | 73/716 |
| 4,051,721 A | 10/1977 | Williams | 324/661 |
| 4,653,508 A | * 3/1987 | Cosman | 73/716 |
| 5,085,070 A | 2/1992 | Miller et al. | |

FOREIGN PATENT DOCUMENTS

| | | | |
|---|---|---|---|
| DE | 3426165 A1 | | 4/1985 |
| JP | 63-309802 | | 12/1988 |
| JP | 01-285247 | * | 11/1989 |
| JP | 2-142206 | | 5/1990 |
| JP | A 4-249726 | | 9/1992 |
| JP | A 4-299227 | | 10/1992 |
| JP | 6-265342 | | 9/1994 |
| JP | 07-055615 | * | 3/1995 |
| JP | 9-101106 | | 4/1997 |
| JP | 11-30623 | | 2/1999 |
| WO | WO 97/48977 | | 12/1997 |

* cited by examiner

Primary Examiner—Christine K. Oda
(74) Attorney, Agent, or Firm—Oliff & Berridge, PLC

(57) ABSTRACT

A sensor unit is formed by a single integral body obtained by coupling a resiliently deforming portion with a base portion without interposing a soft material therebetween, and a force applied to a probe secured to a front end of the resiliently deforming portion is measured as a change in capacitance of a capacitor constituted by electrodes secured to opposing surfaces of the resiliently deforming portion and base portion. These electrodes are connected to a resonance circuit of a high frequency oscillation circuit, and in order to measure a change in a resonance frequency which is varied in accordance with the applied force, an output signal from the high frequency oscillation circuit is counted by a digital frequency counter for a predetermined time period. It is possible to provide the electrocapacitive type force measuring apparatus which can measure a very small force with an extremely high precision without being affected by temperature variation, humidity variation and secular variation.

29 Claims, 6 Drawing Sheets

ELECTROCAPACITIVE FORCE MEASURING APPARATUS

TECHNICAL FIELD

The present invention relates to an apparatus for measuring a small force, and more particularly relates to an electrocapacitive type force measuring apparatus in which an applied force is measured by detecting a change in an electrostatic capacitance.

TECHNICAL BACKGROUND

In the above mentioned electrocapacitive type force measuring apparatus, a measuring sensitivity becomes highly inversely proportional to a spacing of the gap, and therefore in order to measure a very small force with a high sensitivity, it is necessary to set a spacing of the gap to a very small value such as 1–100 μm. In the known electrocapacitive type force measuring apparatus, in order to attain such a fine gap, one of the electrodes is secured onto a flat surface of the base member via a spacer formed by a polymer film having a thickness which is identical with a gap distance to be realized. However, a thickness of such a polymer film is changed in accordance with temperature variation, humidity variation and secular variation, which is a variation or change in a property of a device during an elapse of rather long time, and therefore a spacing of the gap could be maintained accurately. This results in an instability of measuring sensitivity and precision, and a reliable measurement could not be performed.

Japanese Patent Application Laid-open Publications Nos. 4-249726 and 4-299227 disclose apparatuses for measuring a small force or displacement by detecting a change in capacitance due to an applied force. In these known apparatuses, a fine gap is formed between a base member and a resiliently deforming member which can be displaced by a force to be measured and is supported by the base member, a pair of electrodes are arranged on these members to be opposed to each other via the fine gap, and an electrostatic capacitance of a capacitor formed by these electrodes is detected to measure an amount of the applied force or a displacement caused by the applied force.

In the above mentioned electrocapacitive type force measuring apparatus, a measuring sensitivity becomes high inversely proportional to a spacing of the gap, and therefore in order to measure a very small force with a high sensitivity, it is necessary to set a spacing of the gap to a very small value such as 1–100 μm. In the known electrocapacitive type force measuring apparatus, in order to attain such a fine gap, one of the electrodes is secured onto a flat surface of the base member via a spacer formed by a polymer film having a thickness which is identical with a gap distance to be realized. However, a thickness of such a polymer film is changed in accordance with temperature variation, humidity variation and secular variation, and therefore a spacing of the gap could be maintained accurately. This results in an instability of measuring sensitivity and precision, and a reliable measurement could not be performed.

In order to increase a rigidity of the gap forming structure, there has been further proposed to form the resiliently deforming member and base member as a single integral body. Such an integral body can be manufactured by etching a silicon or germanium wafer utilizing the well established processes in the manufacture of semiconductor devices. However, it is very difficult to form the resiliently deforming portion having a length of several tens millimeters such that a part of the resiliently deforming portion is accurately opposed to a part of the base portion with a fine gap of the order of micron meter. Therefore, the measuring precision could not be increased sufficiently, and further a dynamic range is narrow.

For instance, in case of measuring an amount of expansion and compression of a protein sample caused by binding with ligand by the force measuring apparatus, a front end of the resiliently deforming member is coupled to one end of a force detecting probe whose other end is connected to one end of a sample whose other end is fixed. In this case, the probe has a needle-like tip and this tip is pierced into the protein sample. During this operation, a relatively large force is applied to the resiliently deforming member via the probe. Since the rigidity of the resiliently deforming member of the known force measuring apparatus is not sufficiently high, the resiliently deforming member is damaged by such a large force, and in an extreme case, the resiliently deforming member might be broken.

Furthermore, in the known electrocapacitive type force measuring apparatus, in order to measure a change in capacitance of the capacitor constructed by the electrodes arranged to be mutually opposed via the gap, the capacitor is connected in one side of a capacitance bridge circuit or is connected to constitute a resonance circuit together with an inductor. In any case, in the known electrocapacitive type force measuring apparatus, since the capacitance variation of the capacitor is detected by means of an analog circuit, it is difficult to conduct a stable measurement as well as to attain a wide dynamic range due to various factors.

Moreover, the known electrocapacitive type force measuring apparatus is influenced by variations in conductivity, dielectric constant and permeability of air, and a precise measurement could not be carried out under various conditions. That is to say, a water adsorption layer is naturally existent on surfaces of the electrodes constituting the capacitor, and a thickness of this water adsorption layer is changed in accordance with variations in temperature and humidity of a surrounding atmosphere and a capacitance is liable to be unstable. Furthermore, coils and feedback transformer provided in a measuring circuit are also subjected to a variation in temperature, and a stable measurement could not be performed.

Therefore, the present invention has for its object to provide an electrocapacitive type force measuring apparatus for conducting a stable and highly precise measurement with aid of a sensor unit, in which a rigidity of a resiliently deforming portion and a base portion constituting a capacitor can be increased and a distance between electrodes can be accurately maintained in the order of micron meter.

It is another object of the present invention to provide an electrocapacitive type force measuring apparatus, in which a minute variation in the capacitance of the capacitor can be measured in a highly precise and stable manner over a wide dynamic range by means of a measuring circuit which can detect a very small capacitance change accurately and stably by a digital process.

It is still another object of the invention to provide an electrocapacitive type force measuring apparatus, in which an accurate and stable measurement can be performed by reducing variations in humidity and temperature of an atmosphere surrounding sensor unit and measuring circuit.

DISCLOSURE OF THE INVENTION

According to the invention, an electrocapacitive type force measuring apparatus comprises:

a sensor unit including an integral body made of a hard material, said integral body having a resiliently deforming portion which is deformed in a bending fashion by an application of a force to be measured and has a first surface, and a base portion having such a rigidity that the base portion is not deformed by said force and having a second surface which is opposed to said first surface of the resiliently deforming portion via a gap;

first and second electrodes provided on said first and second surfaces of the resiliently deforming portion and base portion of said sensor unit, respectively;

first and second input terminals connected to said first and second electrodes, respectively; and a measuring circuit connected to said first and second input terminals and including an inductor which is connected to a capacitor formed by said first and second electrodes in a serial or parallel manner to form a resonance circuit, said force applied to said resiliently deforming portion being measured as a change in a resonance frequency of said resonance circuit.

In the electrocapacitive type force measuring apparatus according to the invention, since the resiliently deforming portion and base portion are formed as a single integral body made of a hard material, the influences of temperature variation, humidity variation and secular variation, to which the known electrocapacitive type form measuring apparatus having the space made of a soft material arranged between the resiliently deforming portion and the base portion is subjected, can be reduced, and therefore a very small force or displacement can be measured accurately with a very high precision.

In a preferable embodiment of the electrocapacitive type force measuring apparatus according to the invention, said resiliently deforming portion includes a first fitting surface formed at one end of the resiliently deforming portion, said base portion includes a second fitting surface which is coupled to said first fitting surface and is in parallel with said second surface of the base portion, and said second surface of the base portion is retarded from the second fitting surface by a distance which is equal to a distance of said gap. By constructing the sensor unit in this manner, it is possible to obtain easily the fine gap having a distance of, for instance 1–100 µm by polishing the second surface and second fitting surface of the base portion such that these surfaces become coplanar, and then polishing only the second surface to be retarded over a distance identical with a given gap distance.

Furthermore, in the electrocapacitive type force measuring apparatus according to the invention, said resiliently deforming portion and base portion of the sensor unit may be preferably made of a material having low conductivity and small coefficient of thermal expansion such as glass and ceramics, particularly fused quartz.

In a preferable embodiment of the electrocapacitive type force measuring apparatus according to the invention, a first conductive pad connected to said first electrode is provided on the first fitting surface of said resiliently deforming portion, and a second conductive pad connected to said first input terminal is provided on said second fitting surface of the base portion, said resiliently deforming portion is coupled to said base portion by means of said first and second conductive pads to connect electrically said first electrode to said first input terminal. In this structure, the first input terminal for connecting said first electrode provided on the resiliently deforming portion to said measuring circuit can be provided on the base portion, and therefore a conductive lead wire for connecting the first input terminal to the measuring circuit is not connected to the resiliently deforming portion, but to the base portion. Then, a displacement of the resiliently deforming portion can be prevented from being influenced by the conductive lead wire, and a much more accurate measurement can be performed.

When the electrocapacitive type force measuring apparatus according to the invention is applied to the measurement of a deformation or displacement of the above mentioned protein sample, the probe holding the sample can be connected to a front end of the resiliently deforming portion of the sensor unit. In this case, since the resiliently deforming portion has a large rigidity, the resiliently deforming portion is not deformed too much upon piercing the probe into the protein sample, and thus the resiliently deforming portion can be effectively prevented from being damaged.

In a preferable embodiment of the electrocapacitive type force measuring apparatus according to the invention, said measuring circuit comprises an oscillation circuit including said resonance circuit composed of the capacitor and inductor, and a digital frequency change detecting circuit for detecting in a digital manner a change in a frequency of an oscillation signal generated from said oscillation circuit, said frequency being substantially equal to the resonance frequency. By means of such a digital frequency change detecting circuit, a very small frequency change can be detected accurately and stably over a wide dynamic range.

Said frequency change detecting circuit may be constructed by a digital frequency counter for counting the oscillation signal for a predetermined time period, and a digital signal processing circuit for measuring the force applied to the resiliently deforming portion by processing a count value obtained by conducting the counting over a given time period, or may be constructed by a digital frequency counter for counting the oscillation signal, a circuit for measuring a time period during which a count value of the digital frequency counter reaches a predetermined value, and a digital signal processing circuit for measuring the force applied to said resiliently deforming portion by processing an output signal from said time period measuring circuit. An active element of the oscillation circuit may be formed by a semiconductor element having a low input capacitance such as MES-FET, J-FET and MOS-FET.

Moreover, in a preferable embodiment of the electrocapacitive type force measuring apparatus according to the invention, at least parts of said sensor unit and measuring circuit are installed within a housing such that they are isolated from an ambient atmosphere, and a dry air is circulated through the housing. By continuously circulating the dry air through the housing, undesired variations of temperature and humidity of the atmosphere within the housing can be suppressed and a thickness of water adsorption layers formed on the surfaces of the electrodes constituting the capacitor can be kept substantially constant. Therefore, the measurement can be performed stably.

BEST MODE OF THE INVENTION

Figure 1:
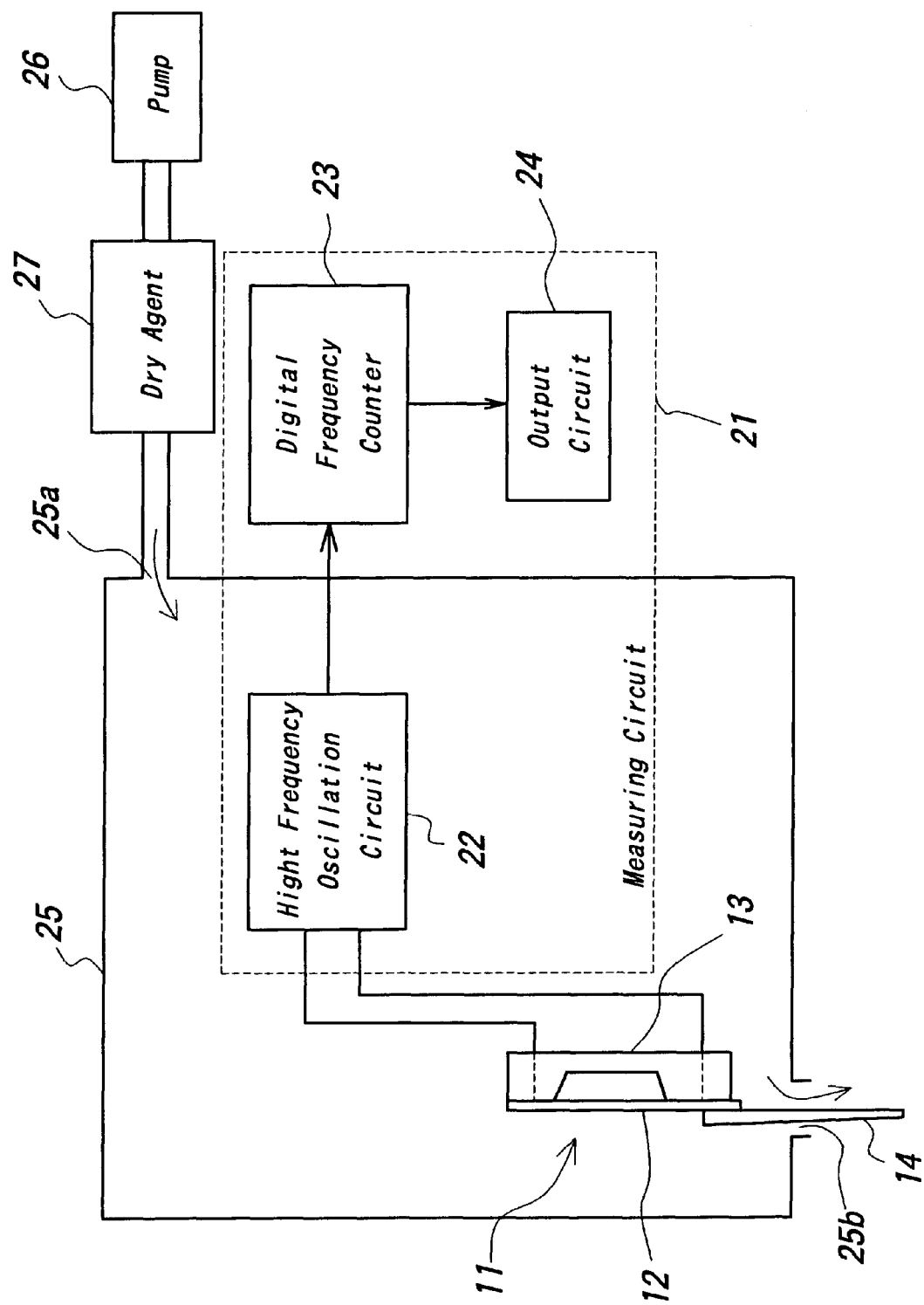
FIG. 1 is a schematic diagram showing a whole structure of an embodiment of the electrocapacitive type force measuring apparatus according to the present invention.

FIG. 1 is a schematic diagram showing a whole structure of an embodiment of the electrocapacitive type force measuring apparatus according to the invention. A sensor unit 11 comprises a resiliently deforming portion 12, a base portion 13 and a probe 14. Detailed structure of these components will be explained later. A pair of electrodes provided in the sensor unit 11 are connected to a high frequency oscillation circuit 22 provided in a measuring circuit 21. The high frequency oscillation circuit 22 generates a high frequency signal whose frequency is determined by a capacitance of a capacitor formed by the electrodes. The high frequency signal is supplied to a digital frequency counter 23, in which the high frequency signal is counted for a predetermined time period to derive a count value. A force applied to the resiliently deforming portion 12 via the probe 14 is measured on the basis of the count value. The force thus measured is displayed or printed out by an output circuit 24.

In the present embodiment, the sensor unit 11 and the high frequency oscillation circuit 22 of the measuring circuit 21 are arranged in a housing 25, and a dry air is introduced into the housing 25 through an inlet 25a by means of a pump 26 and drying agent 27 such as silica gel, and is exhausted from an outlet 25b. By circulating the dry air through the housing 25, temperature and humidity of an atmosphere surrounding the sensor unit 11 and high frequency oscillation circuit 22 provided within the housing can be kept substantially constant, and therefore the measurement can be carried out stably without being affected by variations of temperature and humidity.

Figure 2:
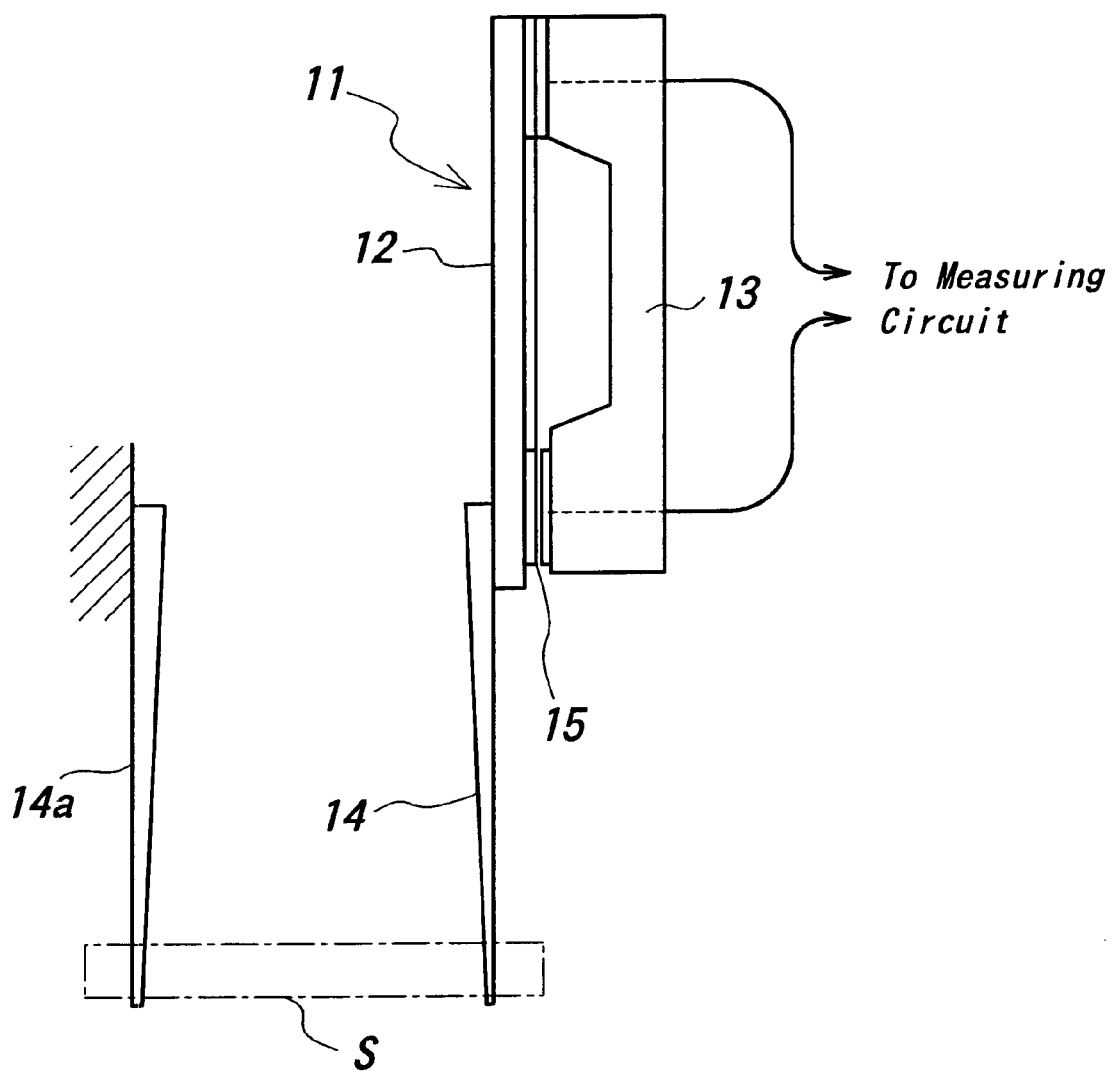
FIG. 2 a side view illustrating a detailed construction of a sensor unit.
Figure 3A:
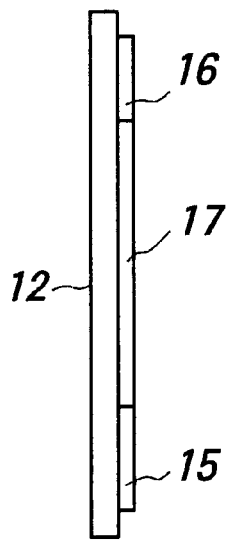
FIGS. 3A and 3B are side view and front view, respectively depicting a resiliently deforming portion of the sensor unit.
Figure 3B:
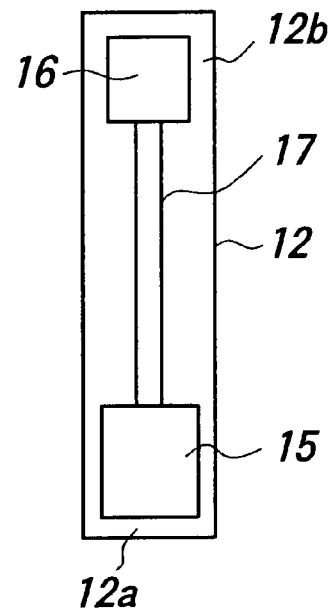
Figure 4A:
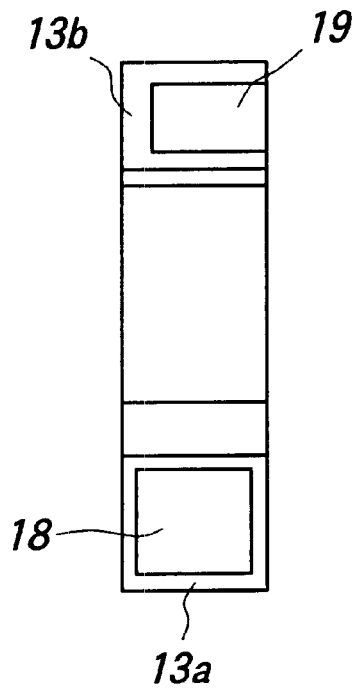
FIGS. 4 and 4B are front view and side view illustrating a detailed structure of a base portion of the sensor unit.
Figure 4B:
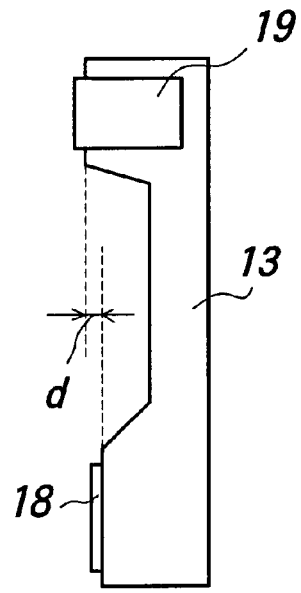

FIG. 2 is a side view showing a detailed structure of the above mentioned sensor unit 11, FIGS. 3A and 3B are side view and front view, respectively of the resiliently deforming portion, and FIGS. 4A and 4B are front view and side view, respectively depicting the base portion 14. The resiliently deforming portion 12 is formed by a flat plate having a thickness of 0.5 mm, a length of about 20 mm and a width of about 5 mm. An electrode 15 constituting the capacitor is provided on one surface of the plate at a lower end portion 12a, an electrode pad 16 is provided at an upper end portion 12b, and these electrode 15 and electrode pad 16 are connected by means of a conductive pattern 17.

The base portion 13 has a substantially U-shaped configuration, and its length is 20 mm and its width is about 5 mm. The other electrode 18 constituting the capacitor is provided at a lower end portion 13a, and an electrode pad 19 is provided at an upper end portion 13b such that the electrode pad 19 is connected to the electrode pad 16. To the upper end portion 13b of the base member 13, is secured the resiliently deforming portion 12. According to the invention, the resiliently deforming portion 12 and base portion 13 are made of a hard material having a low conductivity and a low coefficient of thermal expansion such as glass and ceramics. In the present embodiment, they are made of a fused quartz. The electrodes 15 and 18 and electrode pads 16 and 19 are formed by a vapor deposition of a chemically stable noble metal such as gold and platinum to have a thickness not larger than 1 $\mu$m.

As shown in FIG. 4, the opposing surface 13a of the base portion 12 to which the electrode 18 is secured and a fitting surface 13b are in parallel with each other, but the opposing surface is retarded from the fitting surface by a small distance d which is identical with a desired gap distance. In the present embodiment, the gap distance is about 10 $\mu$m. Such a structure can be easily and precisely obtained by polishing the opposing surface 13a and fitting surface 13b to be coplanar and then polishing only the opposing surface in a parallel fashion over the given distance d. In this case, a parallelity of the opposing surface 13a and fitting surface 13b is preferably not larger than 1–0.1 $\mu$m, particularly not larger than 0.5 $\mu$m.

The fitting surface 12b of the resiliently deforming portion 12 is secured to the fitting surface 13b of the base portion 13. In the present embodiment, since the electrode opposing surface 13a has been retarded from the fitting surface 13b, it is no more necessary to insert a spacer between the fitting surfaces, and the fitting surfaces can be directly coupled to each other. In this case, the coupling may be carried out with the aid of a ceramic glass having a substantially zero thermal expansion, such a ceramic glass is commercially available from Corning Glass Company under the trade name "ZERODURE". In this manner, according to the invention, the resiliently deforming portion 12 and base portion 13 can be coupled with each other to form a single integral body without inserting a soft material therebetween, and therefore the gap distance d does not fluctuate in accordance with temperature variation, humidity variation and secular variation, and a very small force can be measured accurately and stably with a very high precision.

When the electrocapacitive type force measuring apparatus according to the invention is utilized to measure a force generated by a binding of a protein sample with ligand, the probe 14 connected to the lower end of the resiliently deforming portion 12 and a probe 14a whose upper end is fixed are pierced into a sample S at its respective ends as illustrated in FIG. 2. During this piercing operation, a relatively large force is applied to the resiliently deforming portion 12 via the probe 14, but according to the invention, the resiliently deforming portion is made of a hard material and is hardly broken.

Figure 5:
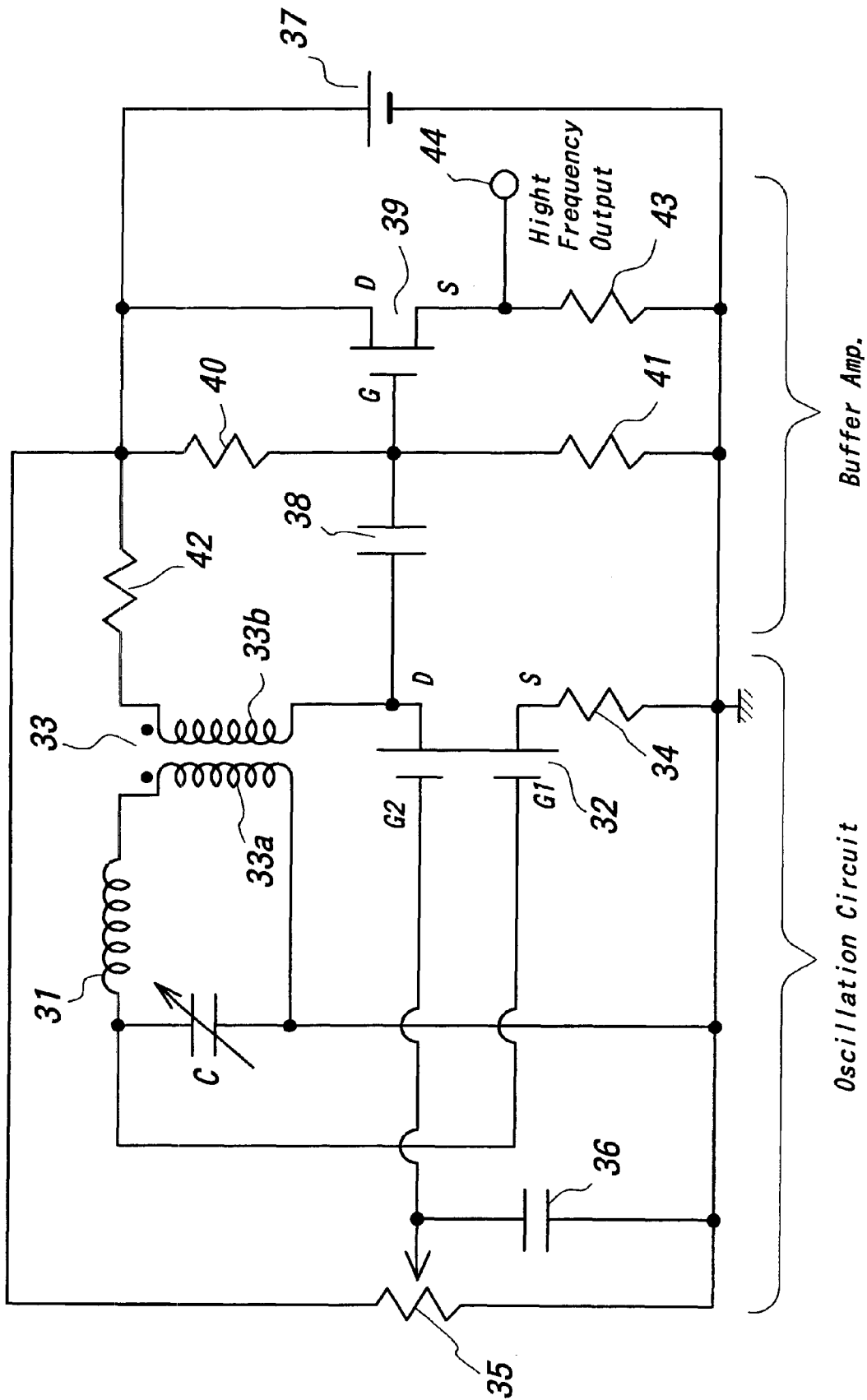
FIG. 5 is a circuit diagram of a high frequency oscillation circuit provided in a measuring circuit.

FIG. 5 is a circuit diagram showing a detailed structure of the high frequency oscillation circuit 22. The capacitor constituted by the electrodes 15 and 18 of the sensor unit 11 is denoted as a variable capacitor C. A capacitance of this variable capacitor C changed within a range of 4–40 pF. In the present embodiment, the capacitor C is connected in series with an inductor 31 to construct a resonance circuit, and a junction between the capacitor C and the inductor 31 is connected to a first gate $G_1$ of a MES-FET 32.

The above mentioned inductor 31 is connected to one end of a primary winding 33a of a feedback transformer 33, the other end of the primary winding being connected to the capacitor C. One end of a secondary winding 33b of the feedback transformer 33 is connected to a drain D of the above mentioned MES-FET 32 to form an oscillation circuit of inductance feedback type. The feedback transformer 33 is formed by directly winding a silver plated copper wire around an empty core or rod-like core made of a material such as fused quartz which is hard and has a small coefficient of thermal expansion as well as a small temperature dependency of dielectric constant and permeability. In this manner, it is possible to obtain the feedback transformer having a highly stable inductance.

A source S of the MES-FET 32 is connected to the ground via a resistor 34 and a second gate $G_2$ is connected to a slide contact of half-fixed resistor 35 for adjusting a bias as well as to the ground by means of a capacitor 36. The half-fixed resistor 35 is connected across a DC voltage supply source 37. The drain D of the MES-FET 32 is further connected to a gate G of an N-type MOS-FET 39 via a coupling capacitor 38, said MOS-FET constituting a buffer amplifier. The gate G of the MOS-FET 39 is connected to a junction between series resistors 40 and 41 connected across the DC voltage supply source 37. The other end of the secondary winding 33b of the feedback transformer 33 is connected to a positive terminal of the DC voltage supply source 37 by means of a resistor 42. Furthermore, a drain D of the MOS-FET 39 is connected to the positive terminal of the DC voltage supply source 37, and a source S is connected to the ground by means of a resistor 43. A junction point between the source S and the resistor 43 is connected to an output terminal 44.

The above mentioned elements have the following values or models:

| | |
|---|---|
| Inductor 31 | 7 $\mu$H |
| Primary and secondary windings of feedback transformer | 1 $\mu$H |
| MES-FET 32 | SGM2006 |
| MOS-FET | 2SK241 |
| Half-fixed resistor 35 | 500 k$\Omega$ |
| Capacitor 36 | 0.1 $\mu$H |
| DC voltage supply source 37 | 3–7 V |
| Resistors 34, 42 | 47 $\Omega$ |

From the output terminal 44 of the high frequency oscillation circuit 22 there is produced a high frequency signal of a frequency of, for instance 30–50 MHz, and this frequency is changed in accordance with a variation in the capacitance of the variable capacitor C. Therefore, when a spacing between the electrodes 15 an 18 is changed in accordance with the force applied to the resiliently deforming portion 12 via the probe 14 as shown in FIG. 1, the capacitance of the capacitor C is changed, and the frequency of the high frequency signal is changed. In this manner, an amount of the force can be measured by detecting the frequency change. In the present embodiment, the high frequency signal generated by the high frequency oscillation circuit 22 is supplied to the digital frequency counter 23 and a count value for a given time period is detected. By utilizing a highly precise standard oscillating element such as a quartz oscillating element as a reference of the high frequency counter 23, a stability amounts to $10^{-6}$–$10^{-8}$, and therefore a very small frequency change can be measured stably with a very high resolution, and further a very wide dynamic range of about $10^5$ can be attained. In the known analog type frequency counter, a dynamic range is at most about $10^3$.

As stated above, according to the invention, the force applied from the external is measured as a change in capacitance of the capacitor via the displacement of the resiliently deforming portion 12. Now this mechanism will be explained theoretically. The resiliently deforming portion 12 is deformed by the application of the external force, and this will be explained by an equation representing a bending movement of a cantilever. Now it is assumed that y is an amount of displacement of the electrode of the resiliently deforming portion 12, F is an external force, E is a Young's modulus (modulus of direct elasticity) of the resiliently deforming portion, $I_z$ is a geometrical moment of inertia, and 1 is a length of a deformed part of the resiliently deforming portion. Then, an amount of displacement may be expressed by the following equation (1):

$$y = \frac{F}{3EI_z} l^3 \qquad (1)$$

wherein $I_z$ may be represented by the following equation (2) in which h and b are thickness and width, respectively of the resiliently deforming portion.

$$I_z = \frac{1}{12} bh^3 \qquad (2)$$

Now it is assumed that $$k = \frac{3EI_z}{l^3} \qquad (3)$$

Then, the displacement is in proportion to the applied force, and the following equation may be obtained.

$$F = \kappa y \qquad (4)$$

The oscillation frequency f is represented by the capacitance C of the capacitor of the sensor unit 11 and the inductance L of the inductor 31 of the resonance circuit in the following equation (5).

$$f = \frac{1}{2\pi\sqrt{LC}} \qquad (5)$$

The capacitance C of the capacitor may be represented by the following equation (6):

$$C = \epsilon S/d \qquad (6)$$

wherein d is a distance of the gap when no force is applied, S is a surface area of the mutually opposing electrodes 15, 18 and $\epsilon$ is a dielectric constant of vacuum (it should be noted that the air has a substantially same dielectric constant).

From the above equations, a variation ratio of the frequency f with respect to the external force F may be obtained. In this case, the distance d of the capacitor is changed by the external force and should be expressed as d±y, and therefore the variation ratio may be expressed by the following equation (7).

$$\frac{df}{dF} = \frac{df}{dy} \cdot \frac{dy}{dF} = \frac{1}{2\pi\sqrt{\epsilon LS}} \frac{1}{2} \frac{1}{\sqrt{d+y}} \cdot \frac{1}{k} \qquad (7)$$

Here, the displacement y due to the external force may be sufficiently smaller than the gap distance, and d±y may be approximated by d. Therefore, the above equation (7) may be rewritten in the following equation (8).

$$\frac{df}{dF} = \frac{1}{4\pi k \sqrt{\epsilon dLS}} \qquad (8)$$

The right hand term is composed by constants, and thus the frequency is proportional to the external force. A proportional constant is expressed by the right hand term of the equation (8).

Figure 6:
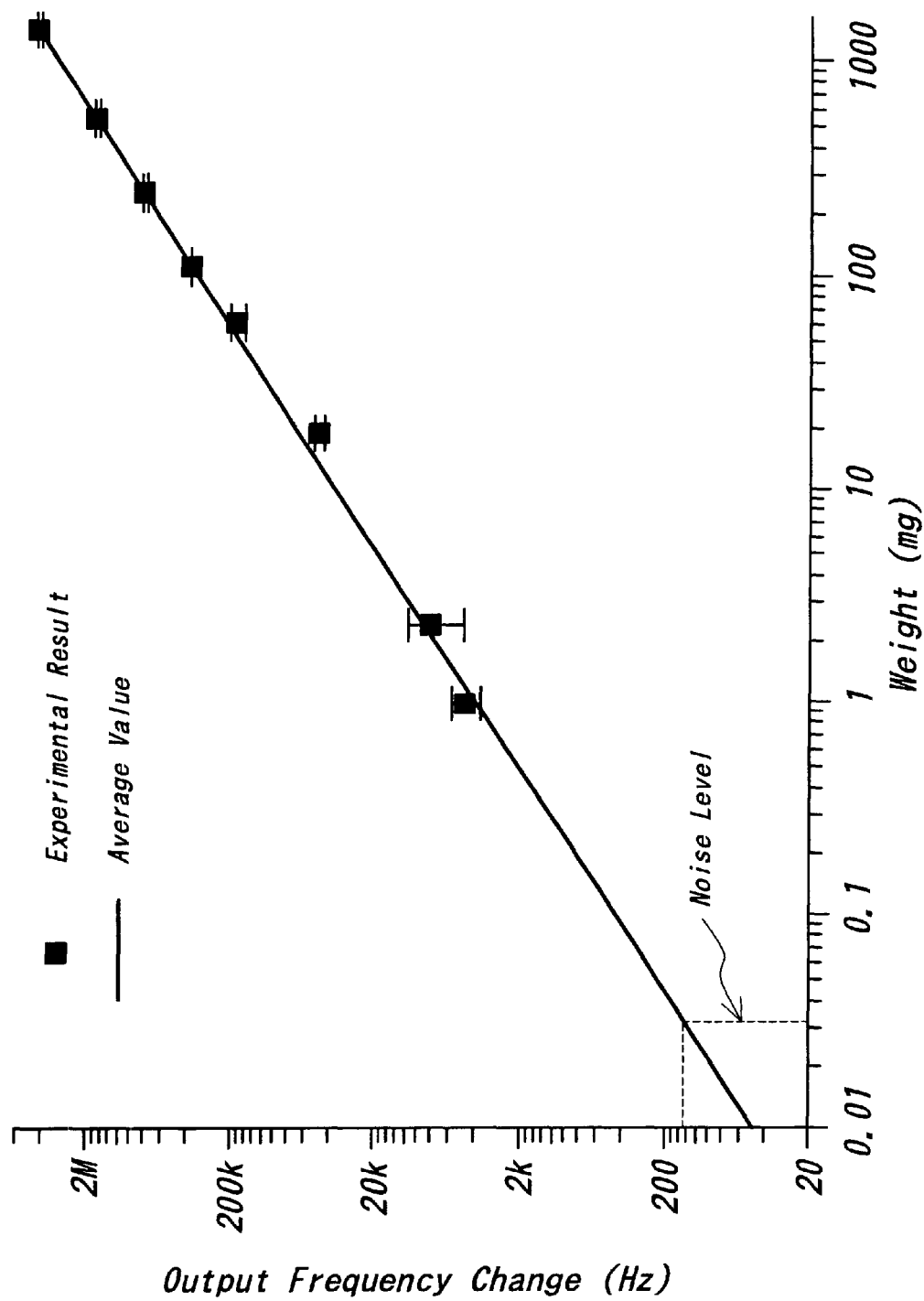
FIG. 6 is a graph representing a relationship between a weigh applied to the resiliently deforming portion and the frequency.

FIG. 6 is a graph showing an actual variation in frequency when the sensor unit 11 is rotated by 90 degrees such that the resiliently deforming portion 12 extends horizontally, and various plumbs are hung from the resiliently deforming portion by means of a thin wire. A horizontal axis denotes a weight of the plumbs changing from 1 mg to 1000 mg, and a vertical axis denotes a frequency change. From the graph, one can understand that the frequency change is proportional to the external force. In this experiment, a frequency at no load is set to 50 MHz, and according to the invention, this frequency is preferably set to 20–60 MHz. It is further assumed that a measuring resolution is about 30 $\mu$g. In this manner, it is confirmed that the electrocapacitive type force measuring apparatus according to the present invention operates substantially theoretically.

Figure 7:
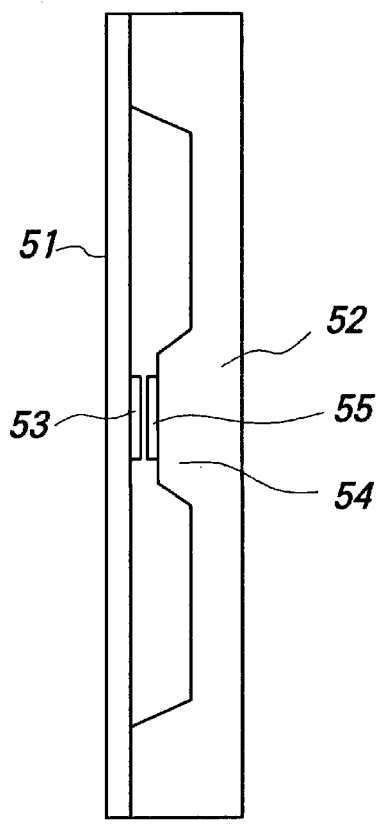
FIG. 7 is a side view showing a structure of a sensor unit of another embodiment of the electrocapacitive type force measuring apparatus according to the invention.

The present invention is not limited to the embodiment explained above, but many alternations and modifications may be conceived by a person skilled in the art within the scope of the invention. For instance, in the above embodiment, the resiliently deforming portion of the sensor unit is formed to have the cantilever structure, but it may be the double cantilever structure as shown in FIG. 7. In this case, both ends of a strip-like resiliently deforming portion 51 are secured to fitting surfaces of a base portion 52, and an electrode 53 provided at a center of the resiliently deforming portion is opposed to an electrode 55 secured to a central projection 54 of the base portion 52 to construct a capacitor.

Figure 8:
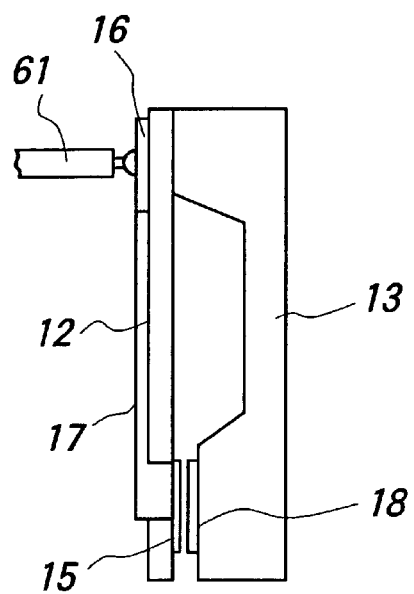
FIG. 8 is a side view depicting another embodiment of the sensor unit.

FIG. 8 shows another embodiment of the sensor unit. In the first embodiment, the electrode 15 provided on the resiliently deforming portion 12 is connected to the measuring circuit by means of the electrode pads 16 and 19. In the present embodiment, the electrode 15 is connected to the electrode pad 16 provided on a surface of the resiliently deforming portion opposite to the fitting surface by means of conductive pattern 17, and a lead wire 61 is connected to the electrode pad 16. In this structure, since the electrode pad is not existent at a coupling area between the resiliently deforming portion 12 and the base portion 13, the fitting surfaces of these portions can be directly secured to each other.

According to the invention, the resiliently deforming portion 12 and base portion 13 may be secured to each other by the mechanical coupling method, laser welding method, chemical surface activation method and so on. For instance, in case of using the laser welding method, two glass members forming the resiliently deforming portion and base portion are stacked and their contact area may be locally heated by a carbon dioxide laser. According to the present invention, although any securing method is utilized, the gap formed between the resiliently deforming portion and the base portion can be accurately maintained without being affected by environmental variations and secular variation, because a soft material is not inserted between these portions.

Furthermore, in the above explained embodiment, the frequency change is measured by counting the high frequency signal generated from the high frequency oscillation circuit 22 by the digital frequency counter 23 for a predetermined time period. However, according to the invention, the frequency change may be measured from a time period within which a count value reaches a predetermined value.

Moreover, in the above explained embodiment, the resiliently deforming portion is made of a glass such as fused quartz, but it may be made of an alloy such as invar. In case of using such a conductive material, it is necessary to provide an insulating means for the electrode. Therefore, it is preferable to make at least the resiliently deforming portion of glass and ceramics having a low conductivity and a small coefficient of thermal expansion.

Industrial Applicability

As explained above in detail, in the electrocapacitive type force measuring apparatus according to the invention, the resiliently deforming portion and base portion of the sensor unit are formed by a single integral body made of a hard material, and therefore the gap distance between the electrodes constituting the capacitor can be maintained accurately to a desired value without being influenced by the temperature variation, humidity variation and secular variation. Therefore, a very small change in the capacitance of the capacitor due to a very small force can be detected highly accurately, and the stable measurement can be performed.

Furthermore, in the embodiment using the digital frequency detecting circuit for measuring in a digital manner a variation in the resonance frequency of the resonance circuit including the capacitor of the sensor unit and inductor, it is possible to detect a small change in the frequency can be detected accurately and stably over a wide dynamic range.

What is claimed is:

1. An electrocapacitive force measuring apparatus comprising:
    a sensor unit including an integral body made of a hard material, said integral body having a resiliently deforming portion which is deformed in a bending fashion by an application of a force to be measured and has a first surface, and a base portion having such a rigidity that the base portion is not deformed by said force and having a second surface which is opposed to said first surface of the resiliently deforming portion via a gap;
    first and second electrodes provided on said first and second surfaces of the resiliently deforming portion and base portion of said sensor unit, respectively;
    first and second input terminals connected to said first and second electrodes, respectively; and
    a measuring circuit connected to said first and second input terminals and including an inductor which is connected to a capacitor formed by said first and second electrodes in a serial or parallel manner to form a resonance circuit, said force applied to said resiliently deforming portion being measured as a change in a resonance frequency of said resonance circuit, wherein a probe is secured to a front end of said resiliently deforming portion, said probe supporting a sample producing the force to be measured.

2. An electrocapacitive force measuring apparatus according to claim 1, wherein said resiliently deforming portion and base portion of the sensor unit are made of a hard material having a low conductivity and a low coefficient of thermal expansion.

3. An electrocapacitive force measuring apparatus according to claim 2, wherein said hard material of the resiliently deforming portion and base portion is glass or ceramic glass.

4. An electrocapacitive force measuring apparatus according to claim 3, wherein said resiliently deforming portion and base portion are made of a fused quartz.

5. An electrocapacitive force measuring apparatus according to claim 1, wherein said resiliently deforming portion includes a first fitting surface formed at one end of the resiliently deforming portion, said base portion includes a second fitting surface which is coupled to said first fitting surface and is in parallel with said second surface of the base portion, and said second surface of the base portion is retarded from the second fitting surface by a distance which is equal to a distance of said gap.

6. An electrocapacitive force measuring apparatus according to claim 5, wherein a first conductive pad connected to said first electrode is provided on the first fitting surface of said resiliently deforming portion, and a second conductive pad connected to said first input terminal is provided on said second fitting surface of the base portion, said resiliently deforming portion is coupled to said base portion by means of said first and second conductive pads to connect electrically said first electrode to said first input terminal.

7. An electrocapacitive force measuring apparatus according to claim 1, wherein said gap has a distance of 1–100 $\mu$m.

8. An electrocapacitive force measuring apparatus according to claim 1, wherein said probe is formed to have a needle shape and is pierced into a protein sample.

9. An electrocapacitive force measuring apparatus according to claim 1, wherein said measuring circuit comprises an oscillation circuit including said resonance circuit composed of the capacitor and inductor, and a frequency change detecting circuit for detecting a change in a frequency of an oscillation signal generated from said oscillation circuit, said frequency being substantially equal to the resonance frequency.

10. An electrocapacitive force measuring apparatus according to claim 9, wherein said frequency change detecting circuit includes a digital frequency counter for counting the oscillation signal, and a digital signal processing circuit for measuring the force applied to the resiliently deforming portion by processing a count value obtained by conducting the counting over a given time period.

11. An electrocapacitive force measuring apparatus according to claim 9, wherein said frequency change detecting circuit comprises a digital frequency counter for counting the oscillation signal, a circuit for measuring a time period during which a count value of the digital frequency counter reaches a predetermined value, and a digital signal processing circuit for measuring the force applied to said resiliently deforming portion by processing an output signal from said time period measuring circuit.

12. An electrocapacitive force measuring apparatus according to claim 9, wherein an active element of the oscillation circuit is formed by a semiconductor element having a low input capacitance.

13. An electrocapacitive force measuring apparatus according to claim 12, wherein said semiconductor element having a low input capacitance is formed by MES-FET, J-FET or MOS-FET.

14. An electrocapacitive force measuring apparatus according to claim 1, wherein a part of said sensor unit and measuring circuit is installed within a housing, and apparatus further comprises a means for circulating a dry air through said housing.

15. An electrocapacitive force measuring apparatus according to claim 1, wherein said resiliently deforming portion and base portion of the sensor unit are coupled with each other by mechanical coupling method, laser welding method or chemical surface activating method, without interposing a soft material between the resiliently deforming portion and the base portion.

16. An electrocapacitive force measuring apparatus comprising:
a sensor unit including a resiliently deforming portion formed by a flat plate made of a hard material and having first and second end surfaces, said resiliently deforming portion being deformed in a bending fashion by an application of a force to be measured, a base portion formed by a substantially U-shape block made of a hard material and having first and second end faces, said first end face being in parallel with the second end face, but being retarded from the second end face by a given gap distance, a first electrode provided on the first end surface of the resiliently deforming portion, a second electrode provided on the first end face of the base portion, a first electrode pad provided on the second end surface of the resiliently deforming portion, a second electrode pad provided on the second end face of the base portion, and a conductive pattern provided on the resiliently deforming portion such that the first electrode is electrically connected to the first electrode pad via said conductive pattern, whereby the resiliently deforming portion and base portion are coupled with each other at the first and second electrode pads; and a measuring circuit having first and second input terminals connected to said second electrode and first electrode pad, respectively, and including an inductor which is connected to a capacitor formed by said first and second electrodes of the sensor unit in a serial or parallel manner to form a resonance circuit, the force applied to said resiliently deforming portion being measured as a change in a resonance frequency of the resonance circuit.

17. An electrocapacitive force measuring apparatus according to claim 16, wherein said resiliently deforming portion and base portion of the sensor unit are made of a hard material having a low conductivity and a low coefficient of thermal expansion.

18. An electrocapacitive force measuring apparatus according to claim 17, wherein said hard material of the resiliently deforming portion and base portion is glass or ceramic glass.

19. An electrocapacitive force measuring apparatus according to claim 18, wherein said resiliently deforming portion and base portion are made of a fused quartz.

20. An electrocapacitive force measuring apparatus according to claim 16, wherein said gap has a distance of 1–100 $\mu$m.

21. An electrocapacitive force measuring apparatus according to claim 16, wherein a probe is secured to a front end of said resiliently deforming portion, said probe supporting a sample producing the force to be measured.

22. An electrocapacitive force measuring apparatus according to claim 21, wherein said probe is formed to have a needle shape and is pierced into a protein sample.

23. An electrocapacitive force measuring apparatus according to claim 16, wherein said measuring circuit comprises an oscillation circuit including said resonance circuit composed of the capacitor and inductor, and a frequency change detecting circuit for detecting a change in a frequency of an oscillation signal generated from said oscillation circuit, said frequency being substantially equal to the resonance frequency.

24. An electrocapacitive force measuring apparatus according to claim 23, wherein said frequency change detecting circuit includes a digital frequency counter for counting the oscillation signal, and a digital signal processing circuit for measuring the force applied to the resiliently deforming portion by processing a count value obtained by conducting the counting over a given time period.

25. An electrocapacitive force measuring apparatus according to claim 23, wherein said frequency change detecting circuit comprises a digital frequency counter for counting the oscillation signal, a circuit for measuring a time period during which a count value of the digital frequency counter reaches a predetermined value, and a digital signal processing circuit for measuring the force applied to said resiliently deforming portion by processing an output signal from said time period measuring circuit.

26. An electrocapacitive force measuring apparatus according to claim 23, wherein an active element of the oscillation circuit is formed by a semiconductor element having a low input capacitance.

27. An electrocapacitive force measuring apparatus according to claim 26, wherein said semiconductor element having a low input capacitance is formed by MES-FET, J-FET or MOS-FET.

28. An electrocapacitive force measuring apparatus according to claim 16, wherein a part of said sensor unit and measuring circuit is installed within a housing, and apparatus further comprises a means for circulating a dry air through said housing.

29. An electrocapacitive force measuring apparatus according to claim 16, wherein said resiliently deforming portion and base portion of the sensor unit are coupled with each other by mechanical coupling method, laser welding method or chemical surface activating method, without interposing a soft material between the resiliently deforming portion and the base portion.

* * * * *